(12) United States Patent
Tosetti et al.

(10) Patent No.: US 8,699,871 B2
(45) Date of Patent: Apr. 15, 2014

(54) OPTICAL NETWORK WITH SHARED LASER ARRAY

(75) Inventors: Carlo Tosetti, Milan (IT); Damiano Rossetti, Monza (IT); Alessandro Cavaciuti, San Donato Milanese (IT)

(73) Assignee: Cisco Technology, Inc., San Jose, CA (US)

( * ) Notice: Subject to any disclaimer, the term of this patent is extended or adjusted under 35 U.S.C. 154(b) by 452 days.

(21) Appl. No.: 12/420,563

(22) Filed: Apr. 8, 2009

(65) Prior Publication Data

US 2010/0260496 A1 Oct. 14, 2010

(51) Int. Cl.
*H04B 10/00* (2013.01)
*H04J 14/00* (2006.01)

(52) U.S. Cl.
USPC ............. 398/2; 398/1; 398/7; 398/66; 398/72

(58) Field of Classification Search
USPC ............. 398/7, 12, 14–17, 19, 22, 23, 25, 34, 398/38, 58–72, 77, 82, 87, 91; 359/333, 359/344; 385/16
See application file for complete search history.

(56) References Cited

U.S. PATENT DOCUMENTS

| | | | |
|---|---|---|---|
| 4,720,162 A * | 1/1988 | Mochizuki et al. ............. | 385/16 |
| 7,450,844 B2 * | 11/2008 | Nabeyama et al. ................ | 398/7 |
| 7,688,501 B2 * | 3/2010 | Yokoyama .................... | 359/344 |
| 2004/0247326 A1 * | 12/2004 | Iwata et al. .................... | 398/198 |
| 2005/0088724 A1 * | 4/2005 | Lee et al. ...................... | 359/333 |
| 2005/0163503 A1 * | 7/2005 | Lee et al. ......................... | 398/19 |
| 2005/0276603 A1 * | 12/2005 | Jung et al. ........................ | 398/71 |
| 2006/0056842 A1 * | 3/2006 | Li et al. ............................ | 398/12 |
| 2006/0115269 A1 | 6/2006 | Shin et al. | |
| 2008/0187314 A1 | 8/2008 | Chung et al. | |
| 2009/0220230 A1 * | 9/2009 | Kim et al. ........................ | 398/72 |
| 2009/0245799 A1 * | 10/2009 | Habel et al. ..................... | 398/79 |
| 2010/0034535 A1 * | 2/2010 | Guignard et al. ................ | 398/25 |

FOREIGN PATENT DOCUMENTS

WO 2007133000 A1 11/2007

OTHER PUBLICATIONS

Ramaswami et al: "Optical Networks: A Practical Perspective", 1998, pp. 291-293.*
International Application Serial No. PCT/US2010/029693, Search Report and Written Opinion mailed Jul. 21, 2010, 11 pages.

* cited by examiner

*Primary Examiner* — Li Liu

(57) ABSTRACT

Method and apparatus for operating for operating an optical network including a shared laser array are disclosed. An example apparatus includes include a first plurality of N lasers. Each laser of the first plurality of N lasers is configured to output a respective optical seed signal having a respective wavelength. The example apparatus further includes a first optical coupler coupled with the first plurality of N lasers. In the example embodiment, the first optical coupler is configured to multiplex the respective optical seed signals of the first plurality of N lasers onto a plurality of N optical fibers. In this example, each optical fiber of first plurality of N optical fibers transmits each of the respective optical seed signals produced by the plurality of N lasers to a respective distribution node for distribution to N respective optical network units, where the optical network units use the optical seed signals to seed respective optical transmitters located at the N optical network units.

20 Claims, 6 Drawing Sheets

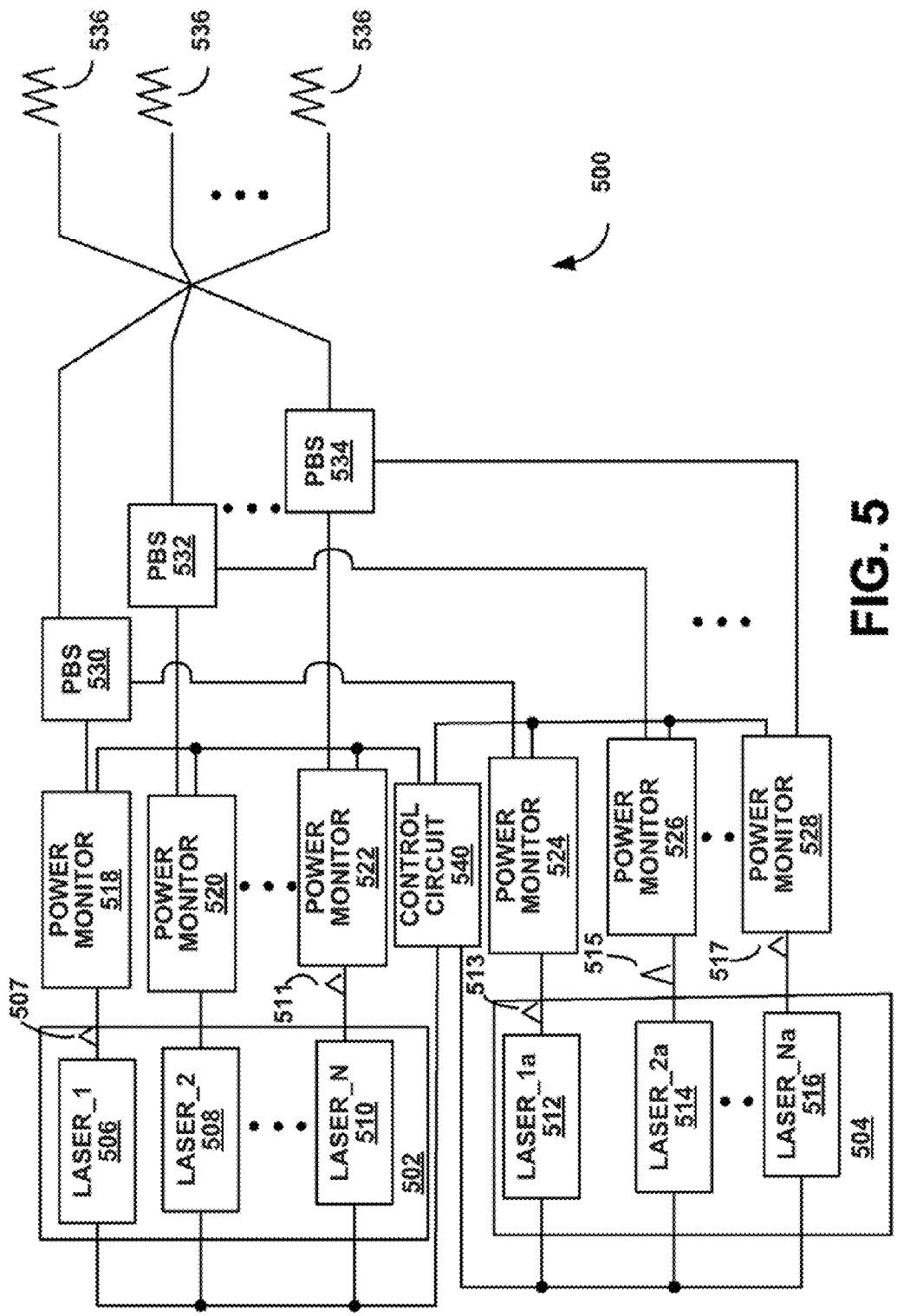

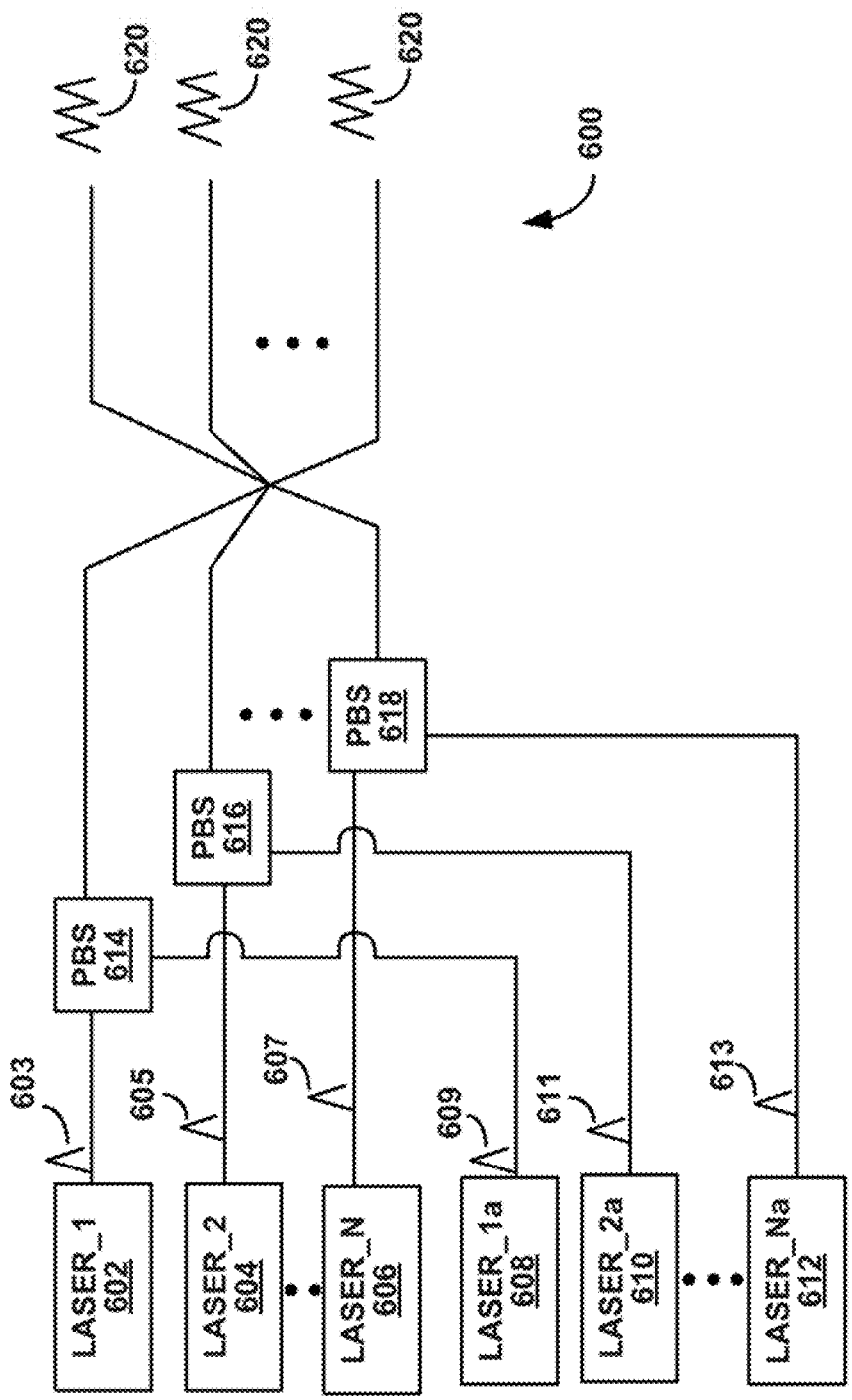

OPTICAL NETWORK WITH SHARED LASER ARRAY

TECHNICAL FIELD

The present disclosure relates generally to optical networks.

BACKGROUND

There are a number of different technologies for providing high bandwidth data communication services to customer premises (e.g., businesses and residences). One such approach is Fiber to the Home technology, which uses optical fibers to carry optical signals in an optical data network from a central office to customer premises. Wavelength Division Multiplexing Passive Optical Network (WDM PON) architectures that are based on Reflective Semiconductor Optical Amplifiers (RSOAs) or externally seeded Fabry Perot (FP) laser interferometers may be used in Fiber to the Home technology. One advantage of such WDM PON architectures is that they allow for providing colorless Optical Line Terminals (OLT) at a central office and colorless Optical Network Units (ONUs) at customer premises.

Both RSOAs and FP laser interferometers require a seeding source. For instance, sliced Broadband Light Sources (BLSs) are used in some implementations. In other implementations, a Wavelength Division Multiplexer (WDM) continuous wave (CW) laser comb is used. However, each of these approaches has drawbacks.

In approaches using a sliced BLS there are limitations on the channel count per light source and limitations on reach (e.g., distance of customer premises from a central office) and performance (e.g., speed and bit error rate). Approaches using WDM CW laser combs, while providing better performance in terms of speed, bit error rate, reach and channel count, are significantly more expensive than approaches using BLSs. The higher cost for WDM CW laser comb approaches is due, in part, to the cost of the WDM CW laser combs, which are relatively expensive, have only a single optical output and, therefore, each WDM CW laser comb delivers optical signals for only a single PON. Another cost concern with such an approach is the need to use low polarization dependent gain (PDG) devices to account for optical signal polarization in such approaches.

BRIEF DESCRIPTION OF THE DRAWINGS

FIG. 5 is a block diagram illustrating another optical signal distribution network including redundancy protection in accordance with an example embodiment.

FIG. 6 is a block diagram illustrating yet another optical signal distribution network including redundancy protection in accordance with an example embodiment.

DESCRIPTION OF EXAMPLE EMBODIMENTS

Overview

Apparatus and/or methods for operating an optical network with a shared laser array, substantially as shown in and/or described in connection with at least one of the figures, as set forth more completely in the claims.

An example apparatus may include a first plurality of N lasers. Each laser of the first plurality of N lasers may be configured to output a respective optical seed signal having a respective wavelength. The example apparatus may further include a first optical coupler coupled with the first plurality of N lasers. In the example embodiment, the first optical coupler may be configured to multiplex the respective optical seed signals of the first plurality of N lasers onto a plurality of N optical fibers. In this example, each optical fiber of first plurality of N optical fibers may transmit each of the respective optical seed signals produced by the plurality of N lasers to a respective distribution node for distribution to N respective optical network units. The optical network units may then use the optical seed signals to seed respective optical transmitters located at the N optical network units. In other embodiments, the optical seed signals may be provided to optical line terminals, where the optical line terminals are located in an optical network central office.

Example Embodiments

Figure 1:
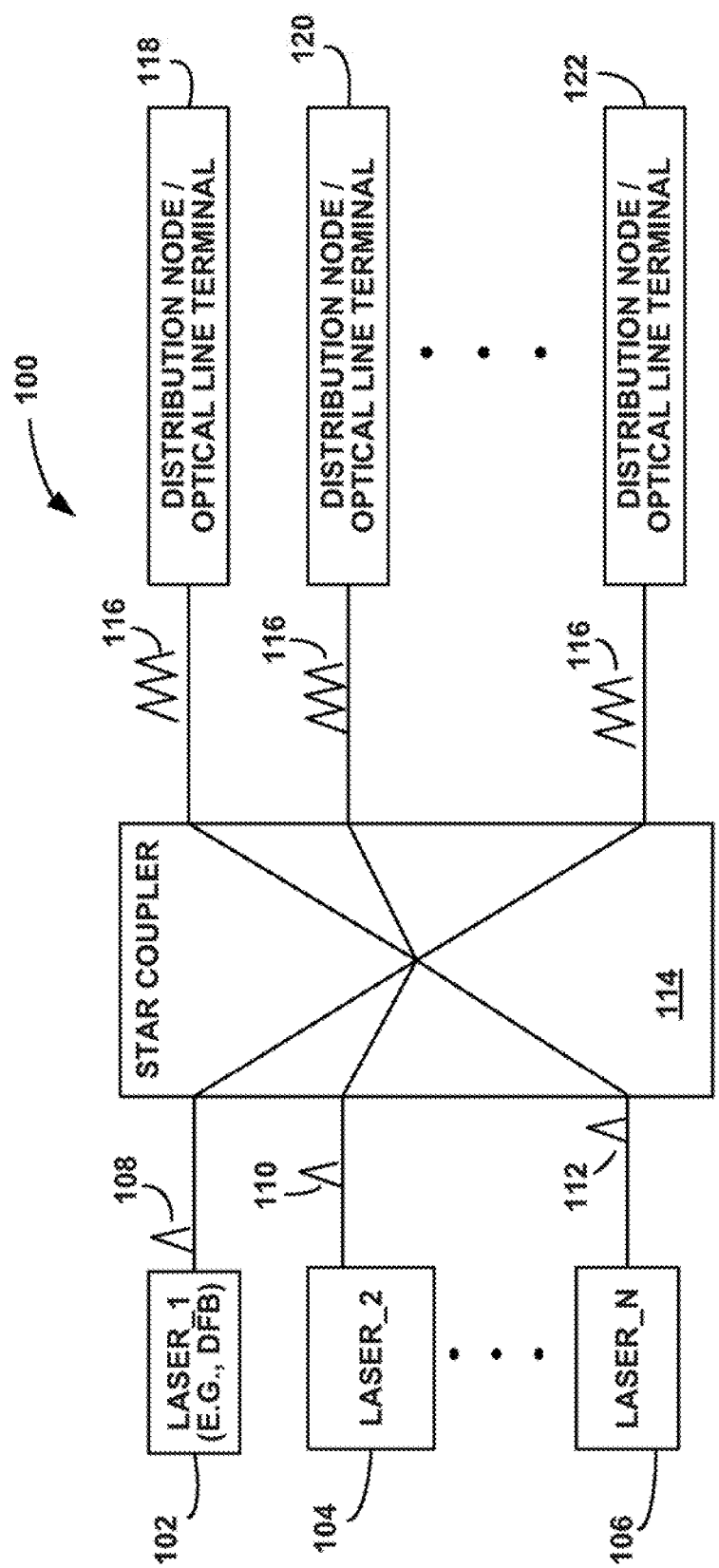
FIG. 1 is a block diagram illustrating an optical signal distribution network in accordance with an example embodiment.

FIG. 1 is a block diagram illustrating an optical signal distribution network 100 in accordance with an example embodiment. The network 100 may be implemented as part of a Fiber to the Home optical data network to distribute optical seed signals for either upstream or downstream data traffic.

The network 100 includes a multi-output laser array that includes N lasers, designated Laser_1 102, Laser_2 104 and Laser_N 108. N could be a number of values. For instance, N may be a value that is a power of two (2), such as 4, 8, 16 or 32. Other values for N are, of course, possible. In the network 100, the N lasers 102-106 may be distributed feedback (DFB) lasers. Such DFB lasers may provide high quality optical seed signals, such as the optical seed signals described herein.

For instance, each of the N lasers 102-106 may produce a respective optical seed signal. As shown in FIG. 1, the Laser_1 102 may produce optical seed signal 108, where the signal 108 has a first wavelength. In like fashion, the Laser_2 104 may produce an optical seed signal 110 having a second wavelength, and the Laser_N 106 may produce an optical seed signal 112 having a third wavelength. As shown in FIG. 1, the optical signals 108, 110 and 112 may have respective wavelengths that, in the frequency domain, offset so as not to result in any substantial interference between the optical seed signals when they are transmitted together on a single optical fiber (e.g., when the signals are multiplexed with each other). In an example embodiment, where N is equal to thirty-two, thirty-two DFB lasers may be used to generate thirty-two optical seed signals of thirty-two wavelengths that do not substantially interference with each other when they are multiplexed with each other and transmitted together on a single optical fiber.

The network 100 also includes an optical star coupler 114. The star coupler 114 has N optical input terminals and N optical output terminals. Depending on the particular embodiment, the star coupler 114 may be a monolithically integrated star coupler. In other embodiments, the star coupler 114 may be implemented using discrete components, such as a plurality of cross-coupled passive couplers. An embodiment using such discrete components is described in further detail below with respect to FIG. 2.

As shown in FIG. 1, the individual optical seed signals 108, 110 and 112 may be provided to respective optical input terminals of the star coupler 114. In the network 100, the star coupler 114 is configured to multiplex the individual optical seed signals 108-112 with each other to produce a multiplexed optical seed signal 116.

As shown in FIG. 1, the multiplexed optical seed signal 116 may be provided at each output terminal of the star coupler 114. For instance, in an embodiment where N is equal to thirty-two, the star coupler 114 would have thirty-two optical input terminals for receiving thirty-two individual optical seed signals (e.g., from thirty-two DFB lasers). In this example, the star coupler 114 would also have thirty-two optical output terminals. In such an implementation, the star coupler 114 may multiplex the respective thirty-two individual optical seed signals into a multiplexed optical seed signal 116 that includes all thirty-two individual optical seed signals. The star coupler 114 may then communicate the multiplexed optical seed signal 116 to each of its thirty-two optical output terminals.

Each optical output port of the star coupler 114 may then communicate the multiplexed optical seed signal 116 to a corresponding optical network device (e.g., distribution nodes/OLTs 118, 120 and 122) using a single optical fiber per optical output terminal of the star coupler 114. In this example, the multiplexed optical seed signal 116 may be provided to thirty-two optical network devices (e.g., distribution nodes/OLTs 118, 120 and 122), one optical network device per optical output port of the star coupler 114.

The multiplexed optical seed signal 116 may then be de-multiplexed by a cyclic arrayed waveguide grating (AWG) in order to provide the thirty two individual optical seed signals to thirty-two optical data network endpoints (e.g., bi-directional optical data communication devices included in an optical line terminal (OLT) or bi-directional optical network units (ONUs) located at customer premises) per optical fiber.

Thus, in an example embodiment, 32 individual optical seed signals from 32 lasers are each multiplexed onto 32 optical fibers, where each fiber carries the 32 individual optical seed signals in multiplexed form. The 32 fibers may then each be used to provide the multiplexed optical seed signal to respective passive optical networks (PONs) or distribution nodes (e.g., distribution nodes 118, 120 or 122), for a total of 32 PONs. In this example, each of the 32 PONs may then de-multiplex the multiplexed optical seed signal and provide the 32 individual optical seed signals to 32 customer premises per PON for use in optical data communication. The individual optical seed signals may then be modulated and amplified by seeded optical transmitters included in the ONUs to generate respective optical data signals that are used for upstream data communication in, for example, a Fiber to the Home optical data network.

In this example, 32 individual optical seed signals are provided to 32 PONs via 32 respective single optical fibers. The 32 individual optical seed signals are de-multiplexed by, for example, respective WDM AWGs included in each of the 32 PONs. The 32 individual optical seed signals are then provided to 32 respective ONUs located at respective customer premises per PON. Accordingly, in this example, 32 lasers may be used to provide optical seed signals for 1,024 ONUs located at customer premises (i.e., 32×32 or N×N). Such an approach represents a substantial cost savings over implementations using CW gratings, which require N lasers to serve N customer premises, or one laser per customer premises as compared to one laser per 32 customer premises. Such an approach also uses laser power more efficiently because the 32 lasers are shared across 32 PONs.

In like fashion as discussed above with regard to using the network 100 to provide optical seed signals to ONUs located at customer premises (e.g., for use in generating upstream optical data signals), the network 100 may be used to provide optical seed signals to bi-directional optical data communication devices included in an OLT located at, for example, a central office of a Fiber to the Home service provider. The optical seed signals provided to the OLTs may be used by corresponding bi-directional optical data communication devices to generate optical data signals for downstream data communication in, for example, Fiber to the Home optical data networks or other optical data network configurations.

For instance, in such an embodiment, each optical output port of the star coupler 114 may communicate the multiplexed optical seed signal 116 to a corresponding OLTs (e.g., OLT 118, 120 or 122) using a single optical fiber per optical output terminal of the star coupler 114. In this example, the multiplexed optical seed signal 116 may be provided to thirty-two optical OLTs. The multiplexed optical seed signal 116 (provided to a given OLT) may then be de-multiplexed by a cyclic AWG included in the given OLT in order to provide the thirty two individual optical seed signals to thirty-two bi-directional optical data communication devices included in or coupled with the given OLT (e.g., at a central office).

Accordingly, in this example, 32 optical seed signals are provided to 32 OLTs via 32 respective single optical fibers. The 32 individual optical seed signals are de-multiplexed by, for example, a WDM AWG included in each of the 32 OLTs. The 32 individual optical seed signals are then provided to 32 respective bi-directional optical data communication devices per OLT. Accordingly, in this example, 32 lasers may be used to provide optical seed signals for 1,024 bi-directional optical data communication devices located at a central office (i.e., 32×32 or N×N).

In similar fashion as discussed above with respect to providing optical seed signals to PONs, such an approach represents a substantial cost savings over implementations using CW gratings, which require N lasers to serve N bi-directional optical data communication devices, or one laser per device. Such an approach also uses laser power more efficiently because the N lasers are shared across N OLTs.

Figure 2:
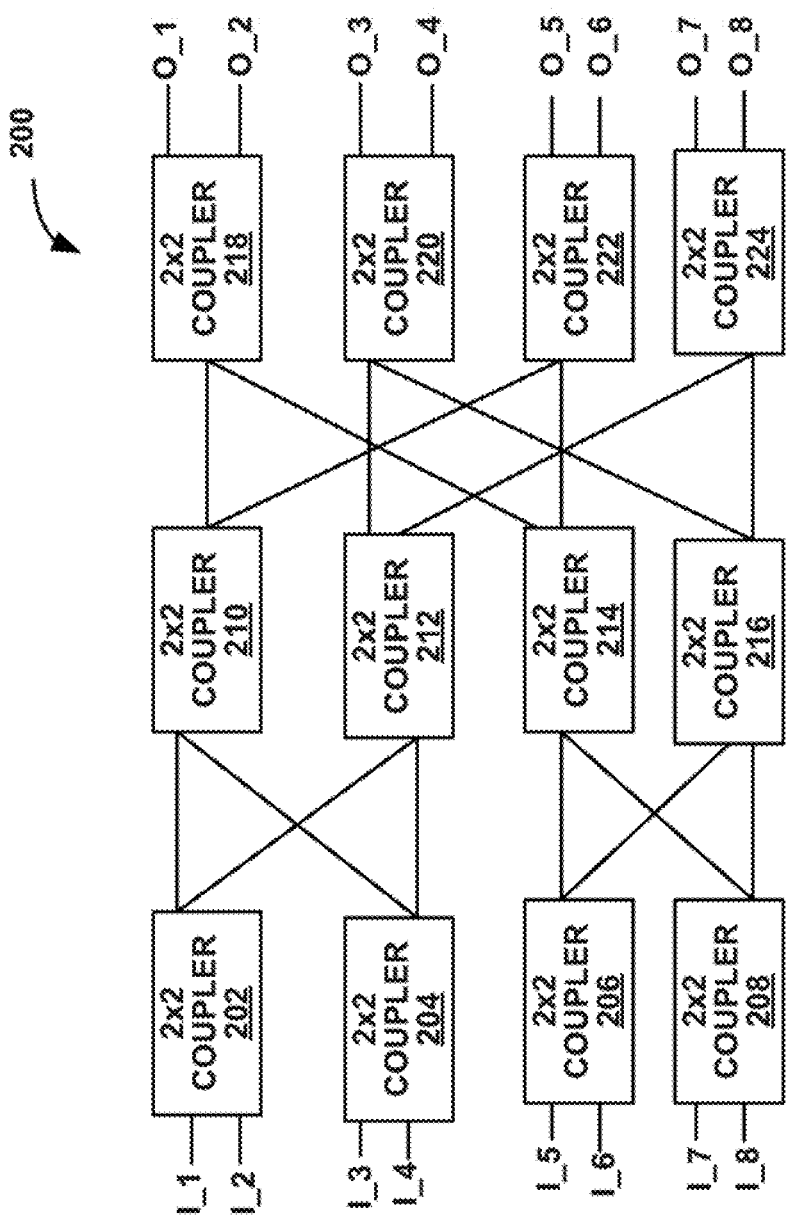
FIG. 2 is a block diagram illustrating an optical star coupler in accordance with an example embodiment.

FIG. 2 is a block diagram illustrating an optical star coupler 200 in accordance with an example embodiment. The star coupler 200 may be implemented, for example, in the embodiments described herein and illustrated in FIGS. 1 and 3-6.

The star coupler 200 is an 8×8 star coupler. As shown in FIG. 2, the star coupler 200 includes eight optical input terminals, I_1 to I_8, and eight optical output terminals, O_1 to O_8. As is also shown in FIG. 2, the star coupler 200 is implemented using a plurality of twelve cross-coupled 2×2 passive couplers 202-224.

In an example embodiment, eight individual optical seed signals may be applied, respectively, to the input terminals, I_1 to I_8, of the star coupler 200. The star coupler 200, via the cross-coupled 2×2 passive couplers 202-224, would multiplex the applied eight individual optical seed signals into a multiplexed optical seed signal. The star coupler 200 would then provide the multiplexed optical seed signal (that includes the eight individual optical seed signals) at each of its eight optical output terminals, O_1 to O_8.

The multiplexed optical seed signal could then be provided to eight PONs or eight OLTs, in like fashion as discussed above with respect to FIG. 1, using eight respective optical fibers. The eight PONs or OLTs could then de-multiplex the eight individual optical seed signals from the multiplexed optical seed signal and provide the eight individual optical seed signals to eight respective ONUs per PON or eight respective bi-directional optical data communication devices per OLT. Thus, in this example, the star coupler 200 may be used to provide optical seed signals to 64 ONUs located at customer premises or 64 bi-directional optical data communication devices located at a central office using 8 lasers.

Similar techniques to those illustrated in FIG. 2 and described above with respect to the star coupler 200 may be used to implement star couplers of different sizes. For example, such techniques may be used to implement N×N star couplers, where N may have a number of values. For instance, the techniques illustrated in FIG. 2 may be used to implement a 4×4 star coupler, a 16×16 star coupler and a 32×32 star coupler. These possible implementations of a star coupler are given by way of example and other star coupler configurations may be implemented using such techniques.

Figure 3:
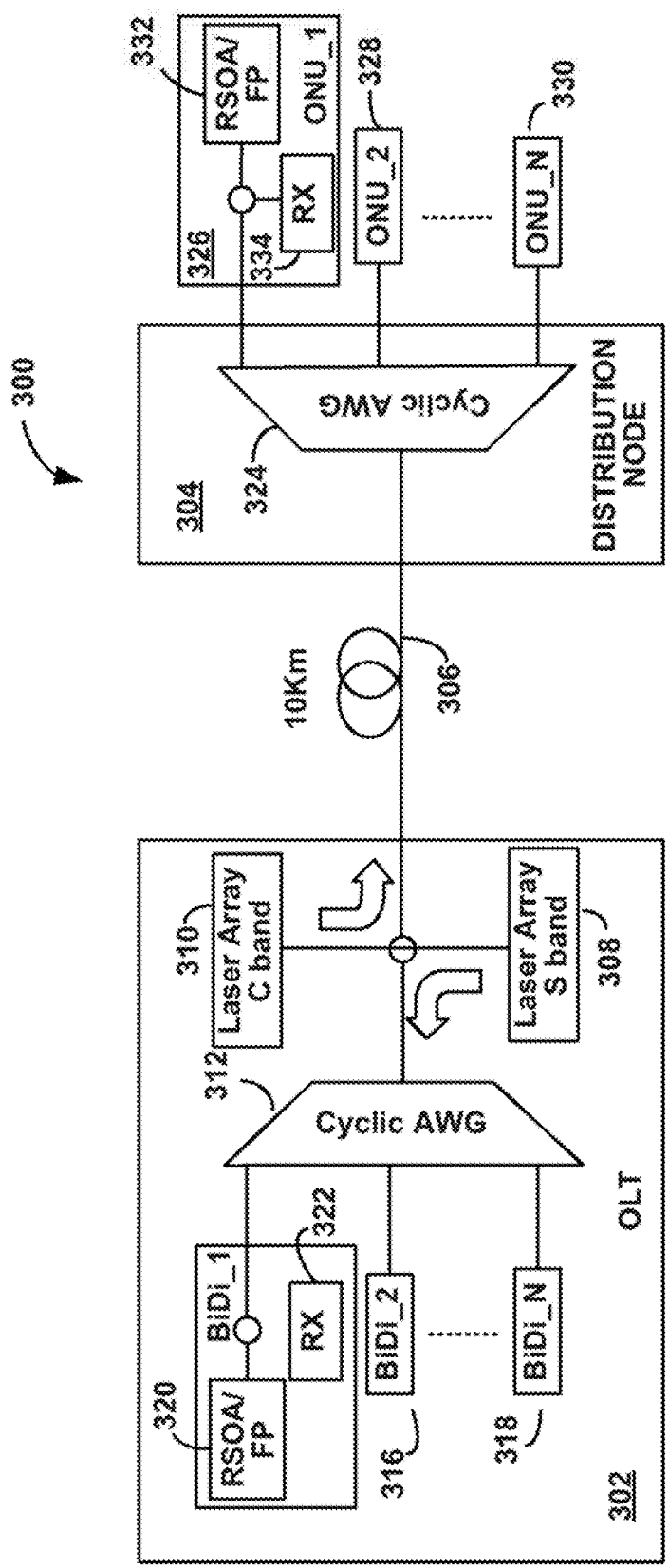
FIG. 3 is a block diagram illustrating an optical network in accordance with an example embodiment.

FIG. 3 is a block diagram illustrating an optical network 300 in accordance with an example embodiment. The network 300 illustrates an optical data network that includes a single OLT 320 and a single PON, where the PON includes a distribution node 304 and a plurality of N ONUs (ONU_1 326, ONU_2 328 and ONU_N 330) that may each be located at respective customer premises. As also shown in FIG. 3, the OLT 302 includes a plurality of N bi-directional optical data communication devices BiDi_1 314, BiDi_2 316 and BiDi_N 318.

In the network 300, optical seed signals may be provided to the OLT 302 and the distribution node 304 in the fashions discussed above with respect to FIGS. 1 and 2. In such implementations, the OLT 302 and the distribution node 304 (e.g., the PON) would be one of N instances of each. For instance, if a 16×16 star coupler were used to provide 16 individual optical seed signals in a multiplexed optical seed signal in the network 300, the OLT 302 would be one of 16 OLTs and the distribution node 304 (PON) would be one of 16 distribution nodes (PONs).

Further, in the network 300, respective multiplexed optical seed signals may be provided to the OLT 302 and the distribution node 304 over optical fiber 306. In an example embodiment, optical fiber 306 may include a first optical fiber for providing a multiplexed optical seed signal to the distribution node 304. The multiplexed optical seed signal may include respective individual optical seed signals for use in ONU_1 326, ONU_2 328 and ONU_N 330 to generate respective upstream optical data signals.

As shown in FIG. 3, the multiplexed optical seed signal provided to the distribution node 304 may be generated using a C-band laser array 310 that includes N lasers to generate N individual optical seed signals. The multiplexed optical seed signal may be generated using the techniques described herein. The multiplexed optical seed signal may then be provided to N distribution nodes (PONs) of the network 300, including the distribution node 304, using respective optical fibers.

As shown in FIG. 3, the distribution node 304 includes a symmetric cyclic AWG 324 that is used to de-multiplex N individual optical seed signals from a multiplexed optical seed signal generated by the laser array 310 and an associated star coupler, such as the star coupler 114 of FIG. 1 or the star coupler 200 of FIG. 2, for example. The distribution node 304 is coupled with the ONUs 326-330. As illustrated by the ONU_1 326 in FIG. 3, each ONU 326-330 may include a seeded optical transmitter 332 and an optical receiver 334.

The optical receiver 334 may be configured to receive downstream data signals from an OLT (e.g., the OLT 302) located in a central office.

In the network 300, the seeded optical transmitter 332 may be implemented as a polarization independent reflective semiconductor optical amplifier (RSOA) or a polarization independent Fabry Perot (FP) laser interferometer. The seeded optical transmitter 334 of each ONU 326-330 may be configured to receive a respective individual optical seed signal, and modulate and amplify the received respective optical seed signal to generate a respective (upstream) optical data signal. Use of polarization independent seeded optical transmitters and symmetric cyclic AWGs allow for providing colorless OLTs and ONUs in optical networks such as those described herein.

Optical fiber 306 may also include a second optical fiber for providing a multiplexed optical seed signal to the OLT 302 for use in bi-directional optical data communication devices BiDi_1 314, BiDi_2 316 and BiDi_N 318 included in the OLT 302. The BiDis 314-318 may use individual optical seed signals included in the multiplexed seed signal to generate respective downstream optical data signals. As shown in FIG. 3, the multiplexed optical seed signal provided to the OLT 302 may be generated using an S-band laser array 308 that includes N lasers to generate N individual optical seed signals. The multiplexed optical seed signal may be generated using the techniques described herein. The multiplexed optical seed signal may then be provided to N OLTs of the network 300, including the OLT 302, using respective optical fibers.

As shown in FIG. 3, the OLT 302 includes a symmetric cyclic AWG 312 that is used to de-multiplex N individual optical seed signals from a multiplexed optical seed signal generated by the laser array 308 and an associated star coupler, such as the star coupler 114 of FIG. 1 or the star coupler 200 of FIG. 2, for example. The OLT 302 also includes the bi-directional optical data communication units (BiDis) 314-318. As illustrated by the BiDi_1 314 in FIG. 3, each BiDi 314-318 may include a seeded optical transmitter 320 and an optical receiver 322. The optical receiver 322 may be configured to receive upstream optical data signals from a PON, such as the PON illustrated in FIG. 3.

In the network 300, the seeded optical transmitter 320 may be implemented as a polarization independent RSOA or a polarization independent FP laser interferometer. The seeded optical transmitter 320 of each BiDi 314-418 may be configured to receive a respective individual optical seed signal, and modulate and amplify the received respective optical seed signal to generate a respective (downstream) optical data signal. Use of polarization independent seeded optical transmitters and symmetrical cyclic AWGs allow for providing colorless OLTs and ONUs in optical networks such as those described herein.

Figure 4:
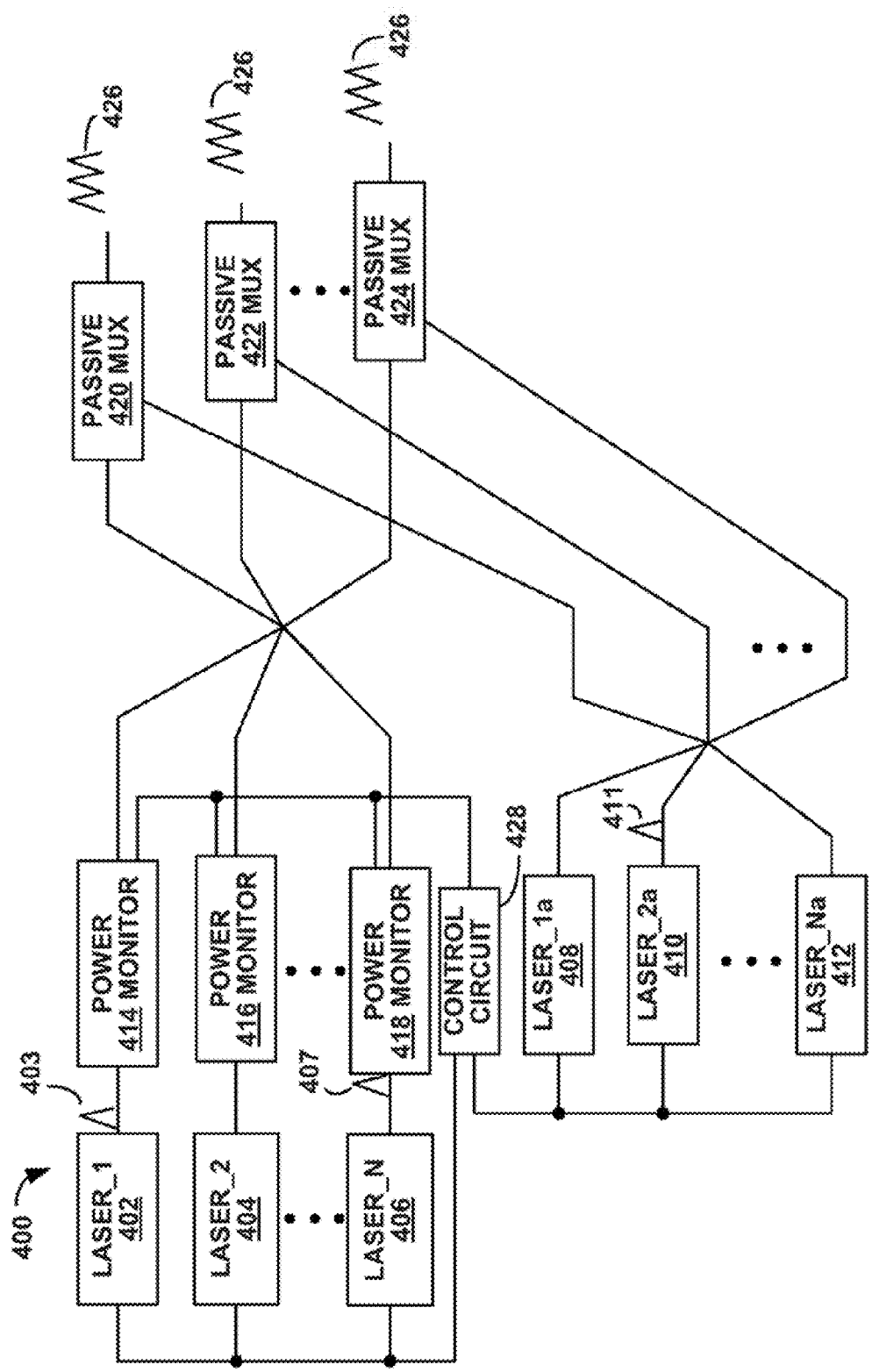
FIG. 4 is a block diagram illustrating an optical signal distribution network including redundancy protection in accordance with an example embodiment.

FIGS. 4-6 illustrate example embodiments of optical signal distribution networks that include redundancy protection by implementing redundant laser arrays. The networks illustrated in FIGS. 4-6 may be used, for example, to distribute optical seed signals for use by seeded optical transmitters to generate optical data signals, such as in the manners describe herein. Of course, the networks illustrated in FIGS. 4-6, as well as the networks illustrated in FIGS. 1 and 3 may be used to distribute other optical signals using the techniques described herein. For example, such networks may be used to distribute optical data signals.

FIG. 4 is a block diagram illustrating an optical signal distribution network 400 including redundancy protection in accordance with an example embodiment. The network 400 may implement active/standby redundancy. In such a configuration, redundant lasers and/or laser arrays are implemented in an optical signal distribution network, such as the network 400. For instance, each laser (e.g., primary laser) may be paired with a single redundant laser, where corresponding primary and redundant lasers have substantially equal wavelengths. In a network implementing active standby/redundancy, only one laser of a primary/redundant laser pair is active at a time, while the other laser is in standby or inactive. In such an approach, power monitors may be used to monitor the output power of each active laser. In the event an active laser's power drops below an output power threshold, which may indicate that the active laser is failing, the active laser may be deactivated and its corresponding redundant laser may be activated in its place.

As noted above, the network 400 may be used to implement active/standby redundancy. The network 400 includes a first laser array that includes a plurality of N lasers, Laser_1 402, Laser_2 404 and Laser_N 406. The network 400 also includes a second laser array including a second plurality of N redundant lasers, respectively, Laser_1a 408, Laser_2a 410 and Laser_Na 412. In like fashion as discussed above, each of the corresponding redundant lasers of the second laser array is configured to output respective optical signal that has a substantially equal wavelength as its corresponding laser in the first laser array, so that corresponding lasers are interchangeable in the network 400.

In the network 400, as one example, the first laser array may be used as a primary laser array, while the second laser array may be used as a redundant array. In such an approach, assuming all the lasers in the first (primary) laser array are operating normally, each laser of the second (redundant) laser array would be disabled. The lasers of the redundant array would only be activated in the event one or more of the lasers of the primary laser array failed.

The network 400 also includes a plurality of N power monitors, including power monitors 414-418, that are each coupled respectively with one of the lasers of the primary laser array. For, instance, the power monitor 414 is coupled with the Laser_1 402. Each of the power monitors 414-418 may be configured to monitor output power of it respective laser of the primary laser array. Each power monitor 414-418 may be further configured to provide an indication when the output power of its respective laser falls below a threshold power, indicating possible failure of the laser associated with such an indication.

As shown in FIG. 4, the network 400 also includes a control circuit 428 that is coupled with the power monitors 414-418, the lasers 402-406 of the primary laser array and the lasers 408-412 of the redundant laser array. In an example embodiment, the control circuit 428 may be configured to receive the indication(s) that the output power of one or more of the primary lasers has fallen below a threshold power. If the control circuit 428 receives such an indication, it may responsively disable the laser or lasers corresponding with the indication or indications and enable the corresponding redundant laser or lasers. In an example embodiment, if one laser of the primary laser array fails, the control circuit 428 may disable the entire primary laser array and enable the entire redundant laser array to replace the primary laser array, rather than replacing an individual laser or lasers of the primary laser array with a corresponding individual redundant laser or lasers. Such an approach may be used, for example, when the lasers arrays are implemented as monolithically-integrated laser arrays.

In the network 400, output terminals of the power monitors 414-418 are coupled with a first optical star coupler to multiplex individual optical seed signals produced by the lasers of the first laser array together to provide a first multiplexed optical seed signal at each output of the first optical star coupler. Likewise, output terminals of the lasers 408-412 are coupled to a second optical coupler, such that the second optical coupler provides a second multiplexed optical seed signal at each of its output terminals by multiplexing individual optical seed signals produced by the lasers of the first laser array together.

As shown in FIG. 4, the network 400 may also include N passive optical multiplexers, including Passive MUX 420, Passive MUX 422 and Passive MUX 424. The passive optical multiplexers are each coupled with corresponding output terminals of the first and second optical star couplers. Such a configuration allows for a redundant laser to be easily activated in place of a failing or failed primary laser. In such an arrangement, the first multiplexed optical seed signal including the individual optical seed signals of the first laser array would be multiplexed (using passive MUXs 420-424) with the second multiplexed optical seed signal including the individual optical seed signals of the first laser array.

In another example embodiment, input terminals of each of the passive MUXs 420-424 may be coupled with a respective output terminal of the power monitors 414-418 and a corresponding output terminal of the lasers 408-412 of the second lasers array (e.g., in a similar arrangement as shown for the polarization beam splitters in FIGS. 5 and 6). In this situation, a single optical star coupler may be used to multiplex the individual optical seed signals provided at output terminals of the passive MUXs 420-424.

An example of a failed primary laser is shown in FIG. 4. As illustrated in FIG. 4, the Laser_1 is providing an optical signal 403 and the Laser_N is providing an optical signal 407. The Laser_2 404 has failed, however, and has been disabled by the control circuit 428. As may also be seen in FIG. 4, the Laser_2a 410 of the redundant laser array is providing an optical signal 411. As discussed generally above, the operating wavelength of the redundant laser 410 is substantially equal to the operating wavelength of the laser 404, its corresponding primary laser. Accordingly, because the primary laser 404 has been replaced by the redundant laser 410 and the output terminals of the first and second optical star couplers are multiplexed, the network 400 is able to provide the multiplexed optical signal 426 at each of its N optical output terminals, even though the primary laser 404 has failed.

FIG. 5 is a block diagram illustrating an optical signal distribution network 500 including balanced redundancy protection in accordance with an example embodiment. In the balanced protection implementation illustrated in FIG. 5, redundant laser arrays are used in similar fashion as with the network 400 illustrated in FIG. 4. As with the network 400, operating wavelengths of corresponding redundant lasers in the network 500 are substantially equal. However, in the balanced protection scheme illustrated by FIG. 5, if all lasers are operating normally, each of the lasers in both the laser arrays is configured to operate at a current below its target current.

For instance, in one example embodiment, each of the lasers in such a network may operate at some fraction of its target operating current. For instance, each of the lasers may operate at 50-75% of its target current. Such an approach may improve reliability of such a network by increasing the mean time between failure (MTBF) due to the decreased operating current of each laser.

Power monitors may be used to monitor the output power of each laser. If a laser's power drops below a threshold power, indicating the laser may be failing, its corresponding redundant laser may be configured to operate at its target current and the failing laser may be disabled or simply allowed to fail on its own. The specific approach may depend on the particular implementation.

The network 500 includes a first monolithically-integrated laser array 502 with N lasers, including a Laser_1 506, Laser_2 508 and a Laser_N 510. The network 500 also includes a second monolithically-integrated laser array 504 with N lasers, including Laser_1a 512, Laser_2a 514 and a Laser_Na 516. The laser arrays 502 and 504 may also be implemented using discrete lasers as well. The network 500 also includes a first plurality of N power monitors, including power monitors 518-522, which are each respectively coupled to a laser of the first laser array 502. The network 500 also includes a second plurality of N power monitors, including power monitors 524-528, which are each respectively coupled to a laser of the second laser array 504.

As discussed generally above, if all the lasers 506-516 of both laser arrays 502 and 504 are operating normally, each of the lasers 506-516 may be configured to operate at a current below its target current. The power monitors 518-528 may respectively monitor the output of each laser. If the output power of one (or more) of the lasers 506-516 falls below a power threshold, the corresponding power monitors may responsively provide an indication to a control circuit 540.

In response to receiving an indication that output power of one of the lasers 506-516 has fallen below the power threshold, the control circuit 540 may enable a corresponding redundant laser of the laser associated with the indication to operate at its target current, rather than below its target current. After enabling the redundant laser to operate at is target current, the control circuit 540 may disable the laser associated with the indication or, alternatively, may simply let the laser associated with the indication continue to operate, which may eventually result in the laser associated with the indication catastrophically failing.

Because both lasers of a redundant laser pair operate simultaneously under normal operating conditions in the network 500, detrimental beating effects would result if passive optical multiplexers (such as used in the network 400) were used to multiplex the outputs terminals of corresponding redundant laser pairs in the network 500. In order to avoid such beating effects, the network 500 includes a plurality of N polarization beam splitters (PBSs) for multiplexing optical signals from the lasers of redundant laser pairs, where the optical signals from the lasers are received via the power monitors 518-528.

An example of a failed laser is shown in FIG. 5. As illustrated in FIG. 5, the Laser_1 506 and its corresponding redundant laser Laser_1a 512 are providing, respectively, optical signals 507 and 513 at a current below their operating current. The Laser_N 510 and its corresponding redundant laser Laser_Na 516 are also providing, respectively, optical signals 511 and 517 at a current below their operating current. The Laser_2 508 has failed, however, and has been disabled by the control circuit 540. As may also be seen in FIG. 5, the Laser_2a 514, the redundant laser of Laser_2 508, is providing an optical signal 515 at its target current. Accordingly, because the Laser_2a 514 has been enabled to operate at its target current, the network 500 is able to provide the multiplexed optical signal 536 at each of its N optical output terminals, even though the Laser_2 508 has failed.

FIG. 6 is a block diagram illustrating an optical signal distribution network 600 implementing another balanced redundancy protection technique in accordance with an example embodiment. In the balanced protection technique implemented in FIG. 6, redundant laser arrays are used in similar fashion as has been previously described. As discussed above, such redundant laser arrays may be implemented in any number of fashions, including using discrete DFB lasers or monolithically-integrated DFB laser arrays, as two examples.

In the balanced protections scheme illustrated in FIG. 6, each of the lasers in both redundant laser arrays is operated at its target current. In such an approach, the use of power monitors (as discussed with respect to the networks 400 and 500) may be eliminated along with the corresponding control circuit. In such a network, if a laser's output power drops below a threshold power, the redundant laser is already operating at it target current, so does not need to be enabled. Therefore, in the balanced protection technique illustrated in FIG. 6, a failing laser continues to operate until it completely fails, while the redundant laser continues to provide an optical signal at the corresponding wavelength of the redundant laser pair.

As shown in FIG. 6, the network 600 includes a first laser array that includes a plurality of N lasers, Laser_1 602, Laser_2 604 and Laser_N 606. The network 600 also includes a second laser array including a second plurality of N redundant lasers, respectively, Laser_1a 608, Laser_2a 610 and Laser_Na 612. Each of the lasers 602, 604, 608, 610 and 612 is providing a corresponding respective optical signal 603, 605, 609, 611 and 613 at its target current. The network 600 also includes a plurality of N polarization beam splitters (PBSs), including PBSs 614-618, for multiplexing optical signals from the lasers of redundant laser pairs of the two laser arrays.

As shown in FIG. 6, the network 600 provides a multiplexed optical signal 620 on each of its optical output terminals. In the event one of the lasers of the first or second arrays fails, the network 600 will continue to provide the multiplexed optical signal 620 on each of its optical output terminals due to the implementation of balanced protection where each of the lasers in the redundant laser arrays is configured to operate at its target current.

While various embodiments of apparatus for optical signal distribution apparatus have been described herein, it will be appreciated that numerous variations are possible. For instance, if it was desirable that a particular embodiment of such an optical signal distribution apparatus had reduced cost at the expensive of reduced performance, that goal may be achieved by increasing the amount of integration of that embodiment. For instance, referring to FIG. 1, the laser array and the star coupler 114 could be implemented in a single, monolithically-integrated device. Of course, the amount of integration employed in any particular embodiment depends, at least in part, on the particular application for that embodiment.

While certain features of the described implementations have been illustrated as described herein, many modifications, substitutions, changes and equivalents will now occur to those skilled in the art.

What is claimed is:

1. An apparatus comprising:
   a first laser array comprising a first plurality of N laser units, wherein each laser unit of the first plurality of N laser units is configured to output a respective first optical seed signal;
   a second laser array comprising a second plurality of N laser units, wherein each laser unit of the second plurality of N laser units is redundant to a corresponding laser unit in the first plurality of N lasers and is configured to output a respective second optical seed signal;

a first plurality of power monitor units, wherein each of the first plurality of power monitor units is coupled to a corresponding laser unit in the first plurality of N laser units and configured to monitor output power of the corresponding laser unit in the first laser array and to provide an indication of when the output power of the corresponding laser unit in the first laser array falls below a threshold power;

a control unit coupled to the power monitor units and configured to receive the indication from one or more of the first plurality of power monitor units when the output power of the corresponding one or more laser units of the first laser array falls below a threshold power and to enable corresponding second plurality of laser units to output corresponding second optical seed signals at sufficient current levels that result in transmission of the second optical seed signals;

a first coupler unit that is coupled to output terminals of the first plurality of power monitor units to multiplex individual first optical seed signals produced by laser units in the first plurality of N laser units;

a second coupler unit that is coupled to output terminals of laser units in the second plurality of N laser units to multiplex individual second optical seed signals produced by the laser units in the second plurality of N laser units; and a plurality of multiplexing units, each of which is coupled to one output terminal of the first coupler unit and one output terminal of the second coupler unit such that each of the plurality of multiplexing units multiplexes a first optical seed signal from the output terminal of the first coupler unit with a second optical seed signal from the output terminal of the second coupler unit.

2. The apparatus of claim 1, wherein each of the laser units of the first laser array comprises a distributed feedback laser.

3. The apparatus of claim 1, wherein a first coupler unit has N optical inputs each of which is coupled to a corresponding power monitor unit, and N optical outputs each of which is coupled to a respective one of the plurality of multiplexing units.

4. The apparatus of claim 1, further comprising a plurality of N optical line terminals (OLTs) and wherein outputs of each of the multiplexing units are coupled to corresponding ones of the plurality of OLTs such that an output of each of the multiplexing units comprises a multiplexed first optical seed signal and second optical seed signal is sent to each of the OLTs.

5. The apparatus of claim 4, wherein each OLT of the plurality of N OLTs comprises:
a cyclic arrayed waveguide grating (AWG) configured to de-multiplex the second optical seed signals of the second plurality of N laser units; and
a plurality of N optical transmitters, each of the plurality of N optical transmitters being coupled with the cyclic AWG and configured to:
receive a respective second optical seed signal of the second plurality of N laser units; and
modulate and amplify its respective optical seed signal to generate a respective optical data signal.

6. The apparatus of claim 5, wherein each of the N optical transmitters comprises one of a reflective semiconductor optical amplifier and a Fabry Perot laser interferometer.

7. The apparatus of claim 1, wherein each of the second plurality of N laser units of the second laser array is configured to output the second optical seed signal at substantially equal wavelengths as the first optical seed signal of its corresponding laser unit in the first laser array and wherein the control circuit unit is configured to disable appropriates ones of the first plurality of laser units and enable appropriate ones of the corresponding second plurality of laser units in response to receiving the indication from one or more of the power monitor units.

8. The apparatus of claim 1, wherein each of the second plurality of laser units of the second laser array corresponding to a laser unit of the first laser array that falls below the threshold power is configured to output the second optical seed signal at a current level that is a fraction of a target current associated with the first optical seed signal of corresponding laser units in the first laser array and wherein the control unit is configured to disable appropriate ones of the first plurality of laser units and to increase the current level of appropriate ones of the corresponding second plurality of laser units in response to receiving the indication from one or more of the power monitor units.

9. The apparatus of claim 1, further comprising a second plurality of power monitor units, wherein each of the second plurality of power monitor units is coupled to a corresponding laser unit in the second plurality of N laser units and configured to monitor output power of the corresponding laser unit in the second laser array and to provide an additional indication of when the output power of the corresponding laser unit in the second laser array falls below a threshold power.

10. The apparatus of claim 1, wherein the plurality of multiplexing units comprise a plurality of N polarization beam splitters (PBSs) and wherein each PBS of the plurality of N PBSs coupled to corresponding first laser units in the first laser array and second laser units in the second laser array are configured to multiplex output terminals of lasers of the first and second pluralities of N lasers having corresponding wavelengths.

11. The apparatus of claim 1, wherein each of the second plurality of laser units of the second laser array corresponding to a laser unit of the first laser array that falls below the threshold power is configured to output the second optical seed signal at one-hundred percent of a target current associated with corresponding ones of the first plurality of N laser units; and
wherein the plurality of multiplexing units comprise a plurality of N polarization beam splitters (PBSs), each PBS of the plurality of N PBSs being configured to multiplex output terminals of lasers of the first and second pluralities of N laser units having corresponding wavelengths.

12. The apparatus of claim 1, wherein the plurality of multiplexing units are passive optical multiplexing units.

13. An apparatus comprising:
a plurality of N optical line terminals (OLTs);
a first laser array comprising a first plurality of N laser units, wherein each laser unit of the first plurality of N laser units is configured to output a respective first optical seed signal;
a second laser array comprising a second plurality of N laser units, wherein each laser unit of the second plurality of N laser units is redundant to a corresponding laser unit in the first plurality of N lasers and is configured to output a respective second optical seed signal;
a first plurality of power monitor units, wherein each of the power monitor units is coupled to a corresponding laser unit in the first plurality of N laser units and configured to monitor output power of the corresponding laser unit in the first laser array and to provide an indication of when the output power of the corresponding laser unit in the first laser array falls below a threshold power;
a control unit coupled to the power monitor units and configured to receive the indication from one or more of the power monitor units when the output power of the corresponding one or more laser units of the first laser array falls below a threshold power and to enable corresponding ones of second plurality of laser units to output corresponding second optical seed signals at sufficient current levels that result in transmission of the second optical seed signals;

a first coupler unit that is coupled to output terminals of the first plurality of power monitor units to multiplex individual first optical seed signals produced by laser units in the first plurality of N laser units;

a second coupler unit that is coupled to output terminals of laser units in the second plurality of N laser units to multiplex individual second optical seed signals produced by the laser units in the second plurality of N laser units; and a plurality of multiplexing units, each of which is coupled to one output terminal of the first coupler unit and one output terminal of the second coupler unit such that each of the plurality of multiplexing units multiplexes a first optical seed signal from the output terminal of the first coupler unit with a second optical seed signal from the output terminal of the second coupler unit.

14. The apparatus of claim 13, wherein each OLT of the plurality of N OLTs comprises:
a cyclic arrayed waveguide grating (AWG) configured to de-multiplex the first and second optical seed signals of the first and second plurality of N lasers from the multiplexed and split optical signal; and
a plurality of N optical transmitters, each of the plurality of N optical transmitters being coupled with the cyclic AWG to receive the first and second optical seed signals of the first and second plurality of N lasers, each of the N optical transmitters being configured to modulate and amplify its respective optical seed signal to generate a respective optical data signal.

15. The apparatus of claim 13, wherein:
the first coupler unit comprises a first N×N optical coupler coupled to the output terminals of the first plurality of power monitor units; and
the second coupler unit comprises a second N×N optical coupler coupled to the output terminals of the laser units in the second plurality of N laser units.

16. The apparatus of claim 15, wherein the first N×N optical coupler comprises an N×N star coupler comprising a plurality of cross-coupled 2×2 passive couplers.

17. The apparatus of claim 13, wherein the first plurality of N laser units comprises a monolithically integrated plurality of distributed feedback laser units.

18. A system comprising:
a first laser array comprising a first plurality of N laser units, wherein each laser unit of the first plurality of N laser units is configured to output a respective first optical seed signal;
a second laser array comprising a second plurality of N laser units, wherein each laser unit of the second plurality of N laser units is redundant to a corresponding laser unit in the first plurality of N lasers and is configured to output a respective second optical seed signal;

a first plurality of power monitor units, wherein each of the first plurality of power monitor units is coupled to a corresponding laser unit in the first plurality of N laser units and configured to monitor output power of the corresponding laser unit in the first laser array and to provide an indication of when the output power of the corresponding laser unit in the first laser array falls below a threshold power;

a control unit coupled to the power monitor units and configured to receive the indication from one or more of the power monitor units when the output power of the corresponding one or more laser units of the first laser array falls below a threshold power and to enable corresponding second plurality of laser units to output corresponding second optical seed signals at sufficient current levels that result in transmission of the second optical seed signals;

a first coupler unit that is coupled to output terminals of the first plurality of power monitor units to multiplex individual first optical seed signals produced by laser units in the first plurality of N laser units;

a second coupler unit that is coupled to output terminals of laser units in the second plurality of N laser units to multiplex individual second optical seed signals produced by the laser units in the second plurality of N laser units; and a plurality of multiplexing units, each of which is coupled to one output terminal of the first coupler unit and one output terminal of the second coupler unit such that each of the plurality of multiplexing units multiplexes a first optical seed signal from the output terminal of the first coupler unit with a second optical seed signal from the output terminal of the second coupler unit.

19. The apparatus of claim 18, further comprising a plurality of optical network units (ONUs) wherein each ONU comprises an optical transmitter configured to:
receive from one of the plurality of multiplexing units first and second optical seed signals; and
modulate and amplify the first and second optical seed signal to generate a respective optical data signal.

20. The apparatus of claim 18, further comprising a plurality of N optical line terminals (OLTs), wherein each OLT of the plurality of N OLTs comprises:
a cyclic arrayed waveguide grating (AWG) configured to de-multiplex the first and second optical seed signals; and
a plurality of N optical transmitters, each of the plurality of N optical transmitters being coupled with the cyclic AWG to receive the first and second optical seed signals, each of the N seeded optical transmitters being configured to modulate and amplify its respective optical seed signal to generate a respective optical data signal.

* * * * *